(12) United States Patent
Fujiura

(10) Patent No.: US 12,509,006 B2
(45) Date of Patent: Dec. 30, 2025

(54) ELECTRIFIED VEHICLE WITH ELECTRONIC CONTROL UNIT THAT LOCKS CHARGING LID DURING PROGRAM REWRITING

(71) Applicant: TOYOTA JIDOSHA KABUSHIKI KAISHA, Toyota (JP)

(72) Inventor: Keiichi Fujiura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 18/541,361

(22) Filed: Dec. 15, 2023

(65) Prior Publication Data
US 2024/0294127 A1 Sep. 5, 2024

(30) Foreign Application Priority Data
Mar. 4, 2023 (JP) .................. 2023-033265

(51) Int. Cl.
*B60R 16/023* (2006.01)
*B60L 53/16* (2019.01)
*G06F 8/65* (2018.01)
*B60R 25/04* (2013.01)

(52) U.S. Cl.
CPC .......... *B60R 16/0231* (2013.01); *B60L 53/16* (2019.02); *G06F 8/65* (2013.01); *B60L 2250/12* (2013.01); *B60L 2270/40* (2013.01); *B60R 2025/0405* (2013.01)

(58) Field of Classification Search
CPC ........ B60R 16/0231; B60R 2025/0405; B60R 16/02; B60L 53/16; B60L 2250/12; B60L 2270/40; B60L 53/14; B60L 58/10; G06F 8/65; Y02T 10/70; Y02T 10/7072
See application file for complete search history.

(56) References Cited

U.S. PATENT DOCUMENTS

| | | | |
|---|---|---|---|
| 2015/0210166 A1* | 7/2015 | Nakagawara | B60L 50/51 701/22 |
| 2021/0389940 A1 | 12/2021 | Iwata et al. | |
| 2022/0063428 A1* | 3/2022 | Kamikihara | H02J 7/02 |
| 2022/0410754 A1 | 12/2022 | Sakurai et al. | |
| 2023/0138510 A1 | 5/2023 | Shizuka et al. | |

FOREIGN PATENT DOCUMENTS

| | | |
|---|---|---|
| JP | 2021-105922 A | 7/2021 |
| WO | 2020/115819 A1 | 6/2020 |
| WO | 2021/177224 A1 | 9/2021 |
| WO | 2021/186204 A1 | 9/2021 |

* cited by examiner

*Primary Examiner* — Michael C Zarroli
(74) *Attorney, Agent, or Firm* — SoraIP, Inc.

(57) ABSTRACT

An electrified vehicle includes a power storage device, a charger that charges the power storage device using power from an external power source, and a charging inlet that is connectable to a charging connector of the external power source and connected to the charger via a power line, an openable and closable charging lid that covers the charging inlet from the outside, a lock mechanism that locks the charging lid in a closed state, and a control device that controls charging of the power storage device by the charger and the lock mechanism and that is able to rewrite a program via wireless communication. The control device locks the charging lid in the closed state by the lock mechanism while rewriting of the program is being executed.

3 Claims, 2 Drawing Sheets

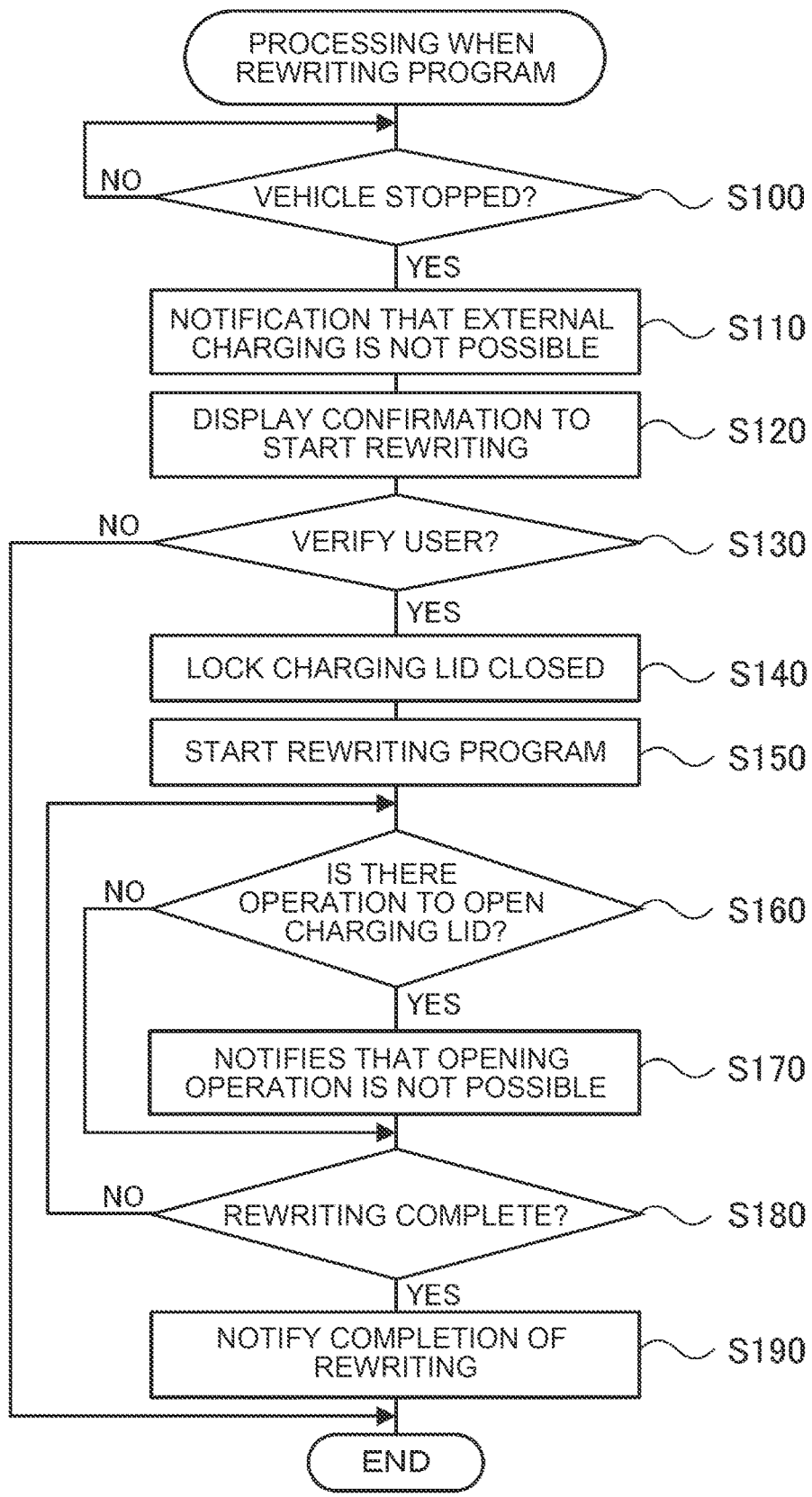

ELECTRIFIED VEHICLE WITH ELECTRONIC CONTROL UNIT THAT LOCKS CHARGING LID DURING PROGRAM REWRITING

CROSS-REFERENCE TO RELATED APPLICATION

This application claims priority to Japanese Patent Application No. 2023-033265 filed on Mar. 4, 2023 incorporated herein by reference in its entirety.

BACKGROUND

1. Technical Field

The present disclosure relates to an electrified vehicle. Specifically, the present disclosure relates to an electrified vehicle that includes a charger that charges an onboard power storage device by using electric power from an external power source and a control device that is able to rewrite a program via wireless communication.

2. Description of Related Art

As this type of electrified vehicle, one electrified vehicle has been proposed that is equipped with a program update device that executes update processing of a program that operates equipment installed in the vehicle (for example, see WO 2021/186204). The electrified vehicle includes a controller that controls the equipment by applying a program to the equipment and a rechargeable in-vehicle battery that supplies electric power to the controller, and executes a program update process using electric power supplied from the in-vehicle battery when the in-vehicle battery is not being charged.

SUMMARY

However, in the above-mentioned electrified vehicle, when a user attempts to charge the in-vehicle battery using electricity from an external power source during the program update process, the battery is not able to be charged when the program update process is prioritized over battery charging. The user may feel uncomfortable due to the inability to charge the battery.

The main purpose of the electrified vehicle of the present disclosure is to suppress the user from feeling uncomfortable when rewriting of the program is executed.

In order to achieve the above-described main object, the electrified vehicle of the present disclosure adopts the following measures.

An electrified vehicle according to the present disclosure includes a power storage device, a charger that charges the power storage device using electric power from an external power source, a charging inlet connectable to a charging connector of the external power source and connected to the charger via a power line, a charging lid that is openable and closable and that covers the charging inlet from the outside, a lock mechanism that locks the charging lid in a closed state, and a control device that controls charging of the power storage device by the charger and the lock mechanism and that is able to rewrite a program via wireless communication. The control device locks the charging lid in the closed state by the lock mechanism while rewriting of the program is being executed.

An electrified vehicle according to the present disclosure includes a power storage device, a charger that charges the power storage device using electric power from an external power source, a charging inlet connectable to a charging connector of the external power source and connected to the charger via a power line, a charging lid that is openable and closable and that covers the charging inlet from the outside, a lock mechanism that locks the charging lid in a closed state, and a control device that controls charging of the power storage device by the charger and the lock mechanism and that is able to rewrite a program via wireless communication. The control device locks the charging lid in the closed state by the lock mechanism while rewriting of the program is being executed. As a result, even when the user attempts to charge the power storage device using electric power from an external power source while the rewriting of the program is being executed, since the charging lid is locked in the closed state, it is possible to notify the user that charging is not possible based on the fact that the charging lid is not able to be in an open state. As a result, it is possible to suppress the user from feeling uncomfortable when the rewriting of the program is being executed.

In the electrified vehicle according to the present disclosure, the control device may notify, when the rewriting of the program is started, at least one of a message indicating that the charging of the power storage device using electric power from the external power source is not able to be executed while the rewriting of the program is being executed, and a message indicating that the charging lid is locked in the closed state while the rewriting of the program is being executed, as a program rewriting notification item. In this way, before starting the rewriting of the program, the user is able to be informed that the charging of the power storage device using electric power from the external power source is not able to be executed while the rewriting of the program is being executed, or that the charging lid is locked in the closed state while the rewriting of the program is being executed. As a result, it is possible to suppress the user from feeling uncomfortable when the rewriting of the program is being executed. In this case, the control device may notify the program rewriting notification item and allow a user to select whether to execute the rewriting of the program. For example, "Are you sure you want to start rewriting the program? To start, press the start button." may be asked.

In the electrified vehicle according to the present disclosure, the control device may notify, when opening operation of the charging lid is performed while the rewriting of the program is being executed, that the opening operation of the charging lid is not able to be performed. In this way, it is possible to suppress the user from feeling uncomfortable due to the inability to charge the power storage device using electric power from the external power source while the rewriting of the program is being executed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing an example of the program rewriting process executed by the electronic control unit 50.

DETAILED DESCRIPTION OF EMBODIMENTS

Figure 1:
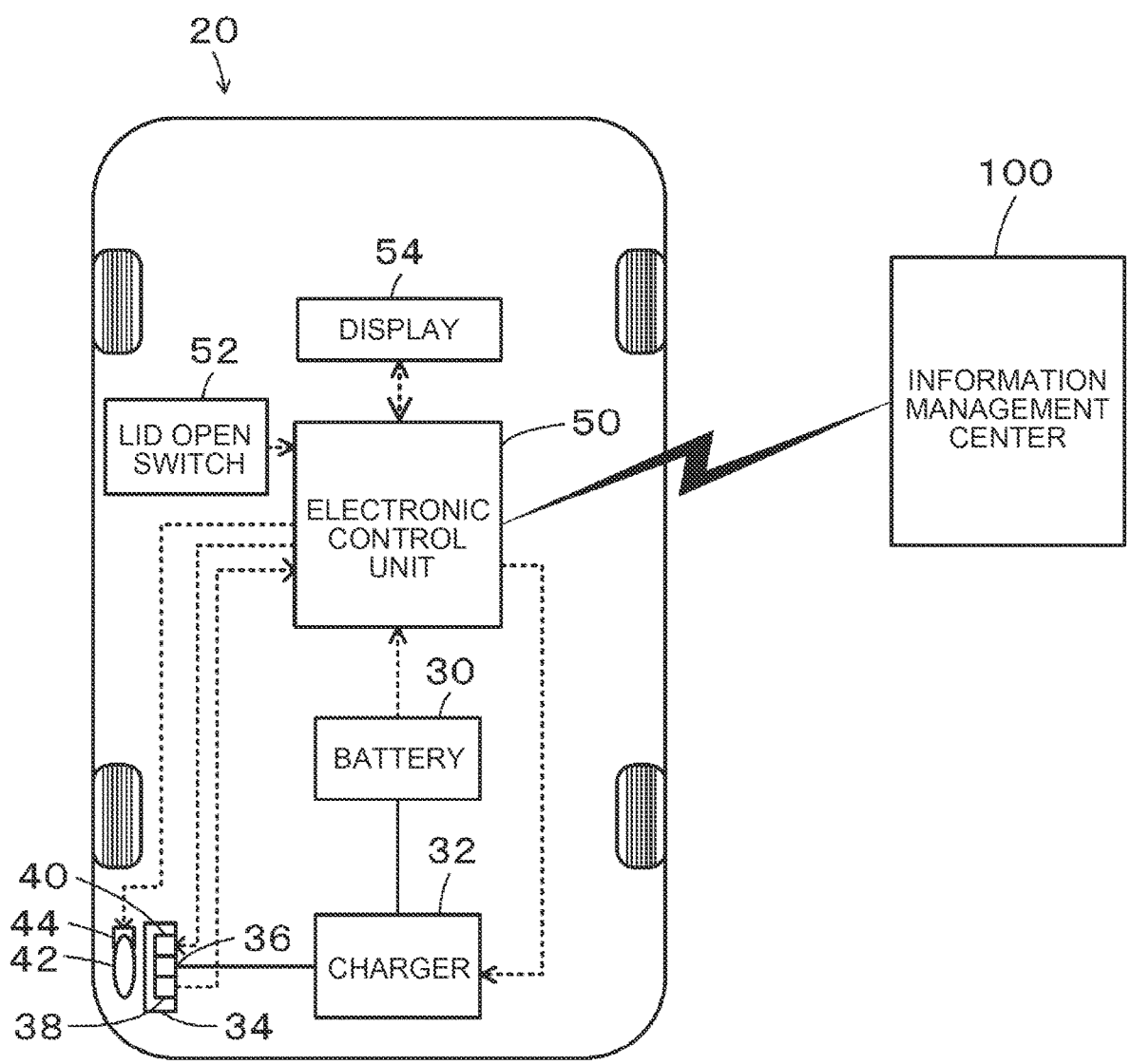
FIG. 1 is a configuration diagram schematically showing the configuration of an electrified vehicle 20 as an embodiment of the present disclosure.

Next, a mode (embodiment) for carrying out the present disclosure will be described. FIG. 1 is a configuration diagram schematically showing the configuration of an electrified vehicle 20 as an embodiment of the present disclosure. As shown in FIG. 1, the electrified vehicle 20 of the embodiment includes a battery 30, a charger 32, a charging inlet 36, a lock device 40, a charging lid 42, a lid lock mechanism 44, and an electronic control unit 50.

The battery 30 is configured as, for example, a lithium ion secondary battery or a nickel hydride secondary battery, and exchanges power with a motor for driving and the like. Charger 32 is connected to charging inlet 36 and battery 30. When a charging connector (not shown), connected to an external power source, is connected to the charging inlet 36, the charger 32 is controlled by the electronic control unit 50 and uses power from the external power source to charge the battery 30.

The charging inlet 36 is arranged in a lid box 34 provided at a charging port (opening) of the electrified vehicle 20. The charging inlet 36 is configured such that a charging connector on the side of an external power source connected to the charging equipment via a charging cable can be attached and detached.

The lock device 40 is configured to be switchable between a locked state and an unlocked state. The locked state is a state in which the charging connector cannot be attached to or detached from the charging inlet 36. The unlocked state is a state in which the charging connector can be attached to and detached from the charging inlet 36.

The charging lid 42 is attached to the vehicle body, for example, via a hinge mechanism. By opening and closing the charging lid 42, the charging port (opening) in which the charging inlet 36 is arranged can be exposed and closed.

The lid lock mechanism 44 is configured to be switchable between a locked state in which the charging lid 42 is locked in a closed state and an unlocked state in which the charging lid can be opened and closed.

The electronic control unit 50 includes a microprocessor having a CPU, ROM, RAM, flash memory, input/output ports, and communication ports. Signals from various sensors are input to the electronic control unit 70 through the input port. Examples of signals input to the electronic control unit 70 include a connection signal from the connection sensor 38 that detects connection of the charging connector to the charging inlet 36, and a voltage sensor attached to the power line connected to the battery 30. battery voltage Vb from a current sensor (not shown) attached to the power line connected to the battery 30, battery current Ib from a lid open switch 52 that instructs to open the charging lid 42. Examples include a switch signal, a touch signal from the display 54 that also functions as a touch panel, and the like. Various control signals are output from the electronic control unit 50 through the output port. The signals output from the electronic control unit 50 include a control signal to the charger 32, a control signal to the lock device 40, a control signal to the lid lock mechanism 44, and a display on the display 54 provided in front of the driver's seat. Examples include control signals. The electronic control unit 50 communicates with an external information management center 100 by wireless communication, receives various programs as necessary, and rewrites the programs.

Next, the operation of the thus configured electrified vehicle 20 of the embodiment, particularly the operation when rewriting a program through wireless communication with the external information management center 100, will be described. FIG. 2 is a flowchart showing an example of the program rewriting process executed by the electronic control unit 50.

When the program rewriting process is executed, the electronic control unit 50 first checks whether the vehicle is stopped (S100). When it is determined that the vehicle is not stopped, the electronic control unit 50 waits for the vehicle to stop. When it is confirmed that the vehicle is stopped, the user is notified by displaying on the display 54 that the battery 30 cannot be charged by the charger 32 using power from an external power source (S110). In addition, the electronic control unit 50 notifies the user of confirmation of the start of rewriting the program by displaying it on the display 54 (S120), and determines whether the user confirms it (S130). An example of a message indicating that the battery 30 cannot be charged by the charger 32 using power from an external power source is "External charging is not possible." or, in addition to this, "The charging lid is locked from opening." etc. can be used. To confirm that you want to start rewriting the program, click the message "Program will be rewritten. May I begin? (Yes) (No)" can be used. (Yes) and (No) function as switches (button) on the touch panel. If the start of rewriting the program cannot be confirmed ((No)), this process is ended without rewriting the program.

When the start of program rewriting is confirmed in S130 ((YES)), the lid lock mechanism 44 is placed in a locked state in which the charging lid 42 is locked in the closed state (S140), and the program rewriting is stopped. The process is started (S150). If the charging lid 42 is opened until the program rewriting is completed, the user is notified by displaying on the display 54 that the charging lid 42 cannot be opened (S160 to S180). An example of a message indicating that the charging lid 42 cannot be opened may be "External charging is not possible because the program is being rewritten. The charging lid is locked closed." etc. can be used.

When it is determined in S180 that the program rewriting is completed, the user is notified that the program rewriting has been completed by displaying it on the display 54 (S190), and the process is ended.

In the electrified vehicle 20 of the embodiment, when the electronic control unit 50 starts rewriting the program through wireless communication with the information management center 100, the battery 30 cannot be charged by the charger 32 using power from an external power source. The user is notified by displaying this on the display 54. This makes it possible to inform the user that the battery 30 cannot be charged before starting the rewriting of the program. As a result, it is possible to suppress the user from feeling uncomfortable when the rewriting of the program is being executed.

In the electrified vehicle 20 of the embodiment, when the electronic control unit 50 starts rewriting the program through wireless communication with the information management center 100, the battery 30 cannot be charged by the charger 352 using power from an external power source. The user is notified by displaying this on the display 54. This makes it possible to inform the user that the battery 30 cannot be charged before starting the rewriting of the program. As a result, it is possible to suppress the user from feeling uncomfortable when the rewriting of the program is being executed.

In the electrified vehicle 20 of the embodiment, when the electronic control unit 50 starts rewriting the program through wireless communication with the information management center 100, the user is notified by displaying confirmation of the start of rewriting the program on the display 54. This allows the user to confirm whether or not the program is to be rewritten.

In the electrified vehicle 20 of the embodiment, when the opening operation of the charging lid 42 is performed until the rewriting of the program is completed, the user is notified by displaying on the display 54 that the charging lid 42 cannot be opened. As a result, it is possible to suppress the user from feeling uncomfortable due to the inability to charge the battery 30 using power from the external power source while the program is being rewritten.

In the electrified vehicle 20 of the embodiment, when the electronic control unit 50 starts rewriting the program through wireless communication with the information management center 100, the battery 30 cannot be charged by the charger 32 using power from an external power source. The user is notified by displaying this on the display 54. However, such notification may be performed by audio output, or may not be performed.

In the electrified vehicle 20 of the embodiment, when the electronic control unit 50 starts rewriting the program through wireless communication with the information management center 100, the user is notified by displaying confirmation of the start of rewriting the program on the display 54. However, such notification may be performed by audio output, or may not be performed.

In the electrified vehicle 20 of the embodiment, when the opening operation of the charging lid 42 is performed until the rewriting of the program is completed, the user is informed by displaying on the display 54 that the charging lid 42 cannot be opened. However, such notification may be performed by audio output, or may not be performed.

In the electrified vehicle 20 of the embodiment, the electronic control unit 50 is adapted to rewrite programs through wireless communication with the information management center 100. However, the electrified vehicle 20 may include a plurality of electronic control units, and any one of the electronic control units may correspond to rewriting the program through wireless communication with the information management center 100.

The correspondence between the main elements of the embodiment and the main elements of the disclosure described in SUMMARY will be explained. In the embodiment, the battery 30 corresponds to a "power storage device". The charger 32 corresponds to a "charger". The charging inlet 36 corresponds to a "charging inlet". The charging lid 42 corresponds to a "charging lid". The lid lock mechanism 44 corresponds to a "lock mechanism". The electronic control unit 50 corresponds to a "control device".

The correspondence between the main elements of the embodiment and the main elements of the disclosure described in SUMMARY is that the embodiment is an example for specifically explaining the disclosure described in SUMMARY. Therefore, the elements of the disclosure described in SUMMARY are not limited. In other words, the disclosure described in the SUMMARY should be interpreted based on the description in the SUMMARY, and the embodiments are only specific examples of the disclosure described in the SUMMARY. It is.

Although the embodiments of the present disclosure have been described above, the present disclosure is not limited to these embodiments in any way, and it goes without saying that it can be implemented in various forms without departing from the gist of the present disclosure.

The present disclosure can be used in the electrified vehicle manufacturing industry, etc.

What is claimed is:

1. An electrified vehicle comprising:
a power storage device;
a charger that charges the power storage device using electric power from an external power source;
a charging inlet connectable to a charging connector of the external power source and connected to the charger via a power line;
a charging lid that is openable and closable and that covers the charging inlet from an outside;
a lock mechanism that locks the charging lid in a closed state; and
an electronic control unit configured to control charging of the power storage device by the charger, to control the lock mechanism, and to rewrite a program via wireless communication, wherein
the electronic control unit is further configured to lock the charging lid in the closed state by the lock mechanism while rewriting of the program is being executed, and to notify that an opening operation of the charging lid is not able to be performed in response to the opening operation of the charging lid being performed while the rewriting of the program is being executed.

2. The electrified vehicle according to claim 1, wherein:
the electronic control unit is further configured to provide a program rewriting notification when the rewriting of the program is started; and
the program rewriting notification includes at least one of
a message indicating that the charging of the power storage device using electric power from the external power source is not able to be executed while the rewriting of the program is being executed, or
a message indicating that the charging lid is locked in the closed state while the rewriting of the program is being executed.

3. The electrified vehicle according to claim 2, wherein the electronic control unit is further configured to allow a user to select whether to execute the rewriting of the program.

\* \* \* \* \*